Patented Oct. 5, 1954

2,691,088

UNITED STATES PATENT OFFICE 2,691,088

OHMIC RESISTANCE

Alfred Ungewiss, Dehme, near Bad Oeynhausen, Germany

No Drawing. Application November 27, 1950, Serial No. 197,847

Claims priority, application Germany November 28, 1949

5 Claims. (Cl. 201—64)

This invention relates to an ohmic resistance with a resistance wire wound on a ceramic carrier. The difficulty in making resistances comprising wire wound on a ceramic carrier body consists, as is well known, in the fact that the coefficient of expansion of the resistance wire is greater than that of the carrier so that, when heating of the resistance takes place in operation of the resistance, the wire comes away from the carrier, warps in an undesirable way and breaks through any surrounding glaze or cement layer.

A further general drawback of the ceramic carriers hitherto used is their low heat conductivity. This manifests itself particularly in overheating of the resistance under heavy load, which sets an undesirable limit to the loading capacity.

The drawbacks enumerated above are remedied according to the invention in that the carrier body has the same coefficient of expansion as the resistance wire and also has a heat conductivity of more than $$2.2 \frac{K \text{ cal}}{hm° C.}$$

in the range of temperature of 20° to 100° C.

According to the invention a carrier of this kind consists wholly or partly of a material of the mixed crystal series—magnesium oxide-titanium dioxide—to which liquefying and plasticising agents are added according to known ceramic processes. For example, magnesium orthotitanate, $2MgO.1TiO_2$, has a mean coefficient of expansion of $101.10^{-7}$ in the temperature range of 20° to 800° C., a titanate, $3MgO.1TiO_2$, one of $106.10^{-7}$ in the same range. Mixed crystals of the compositions $1TiO_2.5MgO$ _____ $113.10^{-7}$ show between 20° and 800° C.

$1TiO_2.20MgO$ _____ $125.10^{-7}$

The heat conductivity of these substances lies between $$3 \text{ and } 3.5 \frac{K \text{ cal}}{hm° C.}$$

in the temperature range of 20° to 100° C., and experience shows that these values increase at high temperatures.

There may also be used according to the invention for the carrier a substance of the mixed crystal series, magnesium oxide-zirconium dioxide, and mixtures of the series $MgO-TiO_2$ and $MgO-ZrO_2$, to which liquefying and plastising agents are added by known ceramic processes.

As an example of a material according to the invention there may be given:

75% magnesium orthotitanate
25% liquefying and plasticising agents with the following heat expansion

| | | |
|---|---|---|
| 100° | 79.2 | $10^{-7}$ |
| 200° | 87.7 | $10^{-7}$ |
| 300° | 91.0 | $10^{-7}$ |
| 400° | 91.9 | $10^{-7}$ |
| 500° | 94.7 | $10^{-7}$ |
| 600° | 98.5 | $10^{-7}$ |
| 700° | 100.1 | $10^{-7}$ |
| 800° | 102.3 | $10^{-7}$ |
| 900° | 105.0 | $10^{-7}$ |
| 1000° | 105.2 | $10^{-7}$ |

By way of comparison it may be stated that the porcelain carriers hitherto used show a coefficient of expansion of only 35 to $45.10^{-7}$ and a heat conductivity of only $$1.3 \ldots 1.4 \frac{K \text{ cal}}{hm° C.}$$

and the corresponding values for the magnesium silicates also used range from 80 to $85.10^{-7}$ and from $$1.9 \text{ to } 2.2 \frac{K \text{ cal}}{hm° C.}$$

in the same range of temperature.

According to the invention there is also the possibility of adapting the coefficient of expansion of the ceramic carrier to that of the resistance wire used. This is done by suitable alteration of the proportion of magnesium oxide-titanium dioxide-zirconium dioxide in the mixed crystal series. It has been found that an increase in the proportion of magnesium oxide causes an increase of the coefficient of expansion with reduction of the heat conductivity and vice versa. A further possibility for adaptation is provided by the use of more or less large proportions of the necessary plasticising and liquefying agents.

I claim:

1. A wire-wound resistor on a ceramic carrier having a coefficient of heat expansion of more than $85.10^{-7}$ and a heat conductivity of more than $$2.2 \frac{K \text{ cal}}{hm° C.}$$

said carrier consisting of mixed crystals of magnesium-oxide and at least one additional oxide selected from the group consisting of titanium dioxide and zirconium dioxide, and a remainder consisting of fluxes and plasticising agents, the molal ratio of magnesium oxide to the additional oxide being from 2 to 1 to 5 to 1.

2. A wire-wound resistor in accordance with claim 1, in which the additional oxide is titanium dioxide, the molal proportion of magnesium oxide and titanium dioxide being 2 to 1.

3. A wire-wound resistor in accordance with claim 1, in which the additional oxide is titanium dioxide, the molal proportion of magnesium oxide and titanium dioxide being 3 to 1.

4. A wire-wound resistor in accordance with claim 1, in which the additional oxide is titanium dioxide, the molal proportion of magnesium oxide and titanium dioxide being 5 to 1.

5. A wire-wound resistor in accordance with claim 1, in which the additional oxide is zirconium dioxide, the molal proportion of magnesium oxide and zirconium dioxide being 2 to 1.

References Cited in the file of this patent

UNITED STATES PATENTS

| Number | Name | Date |
|---|---|---|
| 2,019,457 | Lodge | Oct. 29, 1935 |
| 2,098,812 | Pulfrich | Nov. 9, 1937 |
| 2,165,819 | Albers-Schonberg | July 11, 1939 |
| 2,305,327 | Thurnauer | Dec. 15, 1942 |
| 2,328,410 | Berge | Aug. 31, 1943 |
| 2,369,327 | Wainer | Feb. 13, 1945 |
| 2,424,111 | Navias | July 15, 1947 |
| 2,541,140 | Woodcock et al. | Feb. 13, 1951 |

FOREIGN PATENTS

| Number | Country | Date |
|---|---|---|
| 625,516 | Great Britain | June 29, 1949 |
| 106,485 | Austria | Jan. 15, 1927 |
| 146,502 | Austria | Mar. 15, 1936 |
| 684,932 | Germany | Nov. 16, 1939 |
| 688,239 | Germany | Jan. 25, 1940 |